(12) United States Patent
Chung et al.

(10) Patent No.: US 6,813,021 B2
(45) Date of Patent: Nov. 2, 2004

(54) METHOD AND APPARATUS FOR MONITORING OPTICAL SIGNAL-TO-NOISE RATIO (OSNR) USING POLARIZATION-NULLING METHOD

(75) Inventors: Yun Chur Chung, Taejon (KR); Chul Han Kim, Kyungki-do (KR); Dae Kwang Jung, Kyungsang-namdo (KR); Jun Hang Lee, Kyungki-do (KR)

(73) Assignee: Teralink Communications, Inc., Daejeon (KR)

( * ) Notice: Subject to any disclaimer, the term of this patent is extended or adjusted under 35 U.S.C. 154(b) by 0 days.

(21) Appl. No.: 09/767,919

(22) Filed: Jan. 24, 2001

(65) Prior Publication Data

US 2001/0052981 A1 Dec. 20, 2001

(30) Foreign Application Priority Data

Jun. 5, 2000 (KR) .................................. 10-2000-30869

(51) Int. Cl.[7] .......................... G01J 4/00; G01N 21/00; H04B 17/00; H04B 10/08; H04B 10/12
(52) U.S. Cl. ...................... 356/364; 356/73.1; 398/26; 359/337
(58) Field of Search ............................. 356/73.1, 364; 398/9, 10, 16, 17, 25, 26; 359/333, 337, 341.1, 341.4, 341.44, 349, 110

(56) References Cited

U.S. PATENT DOCUMENTS 5,223,705 A * 6/1993 Aspell et al. ............... 250/225
5,917,649 A * 6/1999 Mori et al. ............. 359/341.31
6,040,933 A * 3/2000 Khaleghi et al. ........... 359/124
6,384,956 B1 * 5/2002 Shieh ......................... 359/256

\* cited by examiner

*Primary Examiner*—Zandra V. Smith
*Assistant Examiner*—Gordon J. Stock, Jr.
(74) *Attorney, Agent, or Firm*—Bacon & Thomas, PLLC

(57) ABSTRACT

The present invention relates to a method and apparatus for automatically monitoring an optical signal-to-noise ratio in which an arbitrarily polarized optical signal including an unpolarized ASE noise is inputted to a rotating quarter-wave plate and then to a rotating linear polarizer so that a maximum power and a minimum power of the signal outputted from the rotating linear polarizer can be detected, and the detected maximum power and minimum power is used for automatically monitoring the optical signal-to-noise ratio. The method for monitoring the optical signal-to-noise ratio (OSNR) using a polarization-nulling method, comprises the steps of: (a) linearly polarizing an arbitrarily polarized optical signal including an unpolarized ASE noise; (b) separating the optical signal and the ASE noise from the linearly polarized optical signal including the unpolarized ASE noise to measure a power of the optical signal and a power of the ASE noise included in a bandwidth of an optical signal; and (c) obtaining the optical signal-to-noise ratio (OSNR) using the measured optical signal power and ASE noise power.

5 Claims, 5 Drawing Sheets

METHOD AND APPARATUS FOR MONITORING OPTICAL SIGNAL-TO-NOISE RATIO (OSNR) USING POLARIZATION-NULLING METHOD

BACKGROUND OF THE INVENTION

1. Field of the Invention

The present invention relates to a method and apparatus for automatically monitoring an optical signal-to-noise ratio (hereinafter, referred to as "OSNR") by using a polarization-nulling method in a wavelength division multiplexed (WDM) optical transmission system, and more particularly, a method and apparatus for automatically monitoring an optical signal-to-noise ratio in which an arbitrarily polarized optical signal including an unpolarized ASE noise is inputted to a rotating quarter-wave plate and then to a rotating linear polarizer so that a maximum power and a minimum power of the signal outputted from the rotating linear polarizer can be detected, and the detected maximum power and minimum power is used for monitoring the optical signal-to-noise ratio.

2. Description of the Related Art

Currently, as a wavelength division multiplexed (WDM) optical transmission technology has been put to practical use, a transmission capacity of an optical transmission system has been increased sharply to over 1 Tb/s. In order to reliably operate and manage such a wavelength division multiplexed (WDM) optical communication network of a very high capacity, a monitoring of a transmission performance of the optical transmission system is necessary, and the transmission performance of such a wavelength division multiplexed (WDM) optical transmission system can be monitored easily by measuring an optical signal-to-noise ratio of each optical signal being transmitted. The optical signal-to-noise ratio is a ratio of a power of an optical signal to a power of a noise included in a bandwidth of the optical signal, which enables recognition of the transmission performance of the optical transmission system.

There have been proposed technologies for measuring an optical signal-to-noise ratio (OSNR) by linearly interpolating an ASE noise level at a wavelength of an optical signal from an ASE noise level at both sides of the wavelength of the optical signal in articles including ["Optical signal quality monitor built into WDM linear repeaters using semiconductor arrayed waveguide rating filter monolithically integrated with eight photodiodes" by published by H. Suzuki and N. Takachio, Electronics letter, Vol. 35, pp.836–837, 1999] and ["Optical performance monitor built into EDFA repeaters for WDM networks" by published by K. Asahi, M. Yamashita, T. Hosoi, K. Nakaya and C. Konoshi, which is presented at optical fiber communication conference, February,. 1998] as a conventional optical signal-to-noise ratio measuring method.

FIG. 1 is a graph illustrating a principle of measuring an optical signal-to-noise ratio (OSNR) using a linear interpolation method.

Referring to FIG. 1, the linear interpolation method is a method of linearly interpolating an ASE noise level at a wavelength of an optical signal from an ASE noise level at both sides of the wavelength of the optical signal such as an extended doted line, and the optical signal-to-noise ratio (OSNR) can be measured by using an interpolated ASE noise level. However, in the wavelength division multiplexed (WDM) optical transmission system in which respective optical signals can pass through different paths and a different number of erbium-doped fiber amplifiers (EDFAs) at any time, the ASE noise levels at the wavelengths of the respective optical signals may be different each other as shown in FIG. 2.

In this case, since the ASE noise level at a wavelength of an optical signal interpolated linearly from the ASE noise level at both sides of the wavelength of the optical signal differs from a practical ASE noise level at the wavelength of the optical signal, there is a problem in that the optical signal-to-noise ratio cannot be measured precisely by the linear interpolation method.

SUMMARY OF THE INVENTION

Therefore, the present invention has been made in view of the above-mentioned problems, and it is an object of the present invention to provide a method and apparatus for automatically monitoring an optical signal-to-noise ratio (OSNR) in which an optical signal and an ASE noise included therein are separated from each other, and an power of each of the optical signal and the ASE noise is measured by using a polarization-nulling method which linearly polarizes an arbitrarily polarized optical signal in a wavelength division multiplexed (WDM) optical transmission system.

According to one aspect of the present invention, there is provided a method for monitoring an optical signal-to-noise ratio (OSNR) using a polarization-nulling method, comprising the steps of:

(a) linearly polarizing an arbitrarily polarized optical signal including an unpolarized ASE noise;

(b) separating the optical signal and the ASE noise from the linearly polarized optical signal including the unpolarized ASE noise to measure a power of the optical signal and a power of the ASE noise included in a bandwidth of an optical signal; and (c) obtaining the optical signal-to-noise ratio (OSNR) using the measured optical signal power and ASE noise power.

Preferably, it may be characterized that the step (a) is performed by allowing the arbitrarily polarized optical signal including the unpolarized ASE noise to pass through a rotating quarter-wave plate.

More preferably, it may be characterized that the step (b) further comprises the steps of:

allowing the linearly polarized optical signal including the unpolarized ASE noise to pass through a rotating linear polarizer;

measuring a minimum power and a maximum power of the signal outputted from the rotating linear polarizer; and measuring the power of the optical signal and the power of the ASE noise included in the bandwidth of the optical signal from the measured minimum power and maximum power of the signal outputted from the rotating linear polarizer.

According to another aspect of the present invention, there is also provided an apparatus for monitoring an optical signal-to-noise ratio (OSNR) using a polarization-nulling method, comprising:

a rotating quarter-wave plate adapted to linearly polarize an arbitrarily polarized optical signal including an unpolarized ASE noise more than four times during the 360 degree rotation of the quarter-wave plate to output the linearly polarized optical signal;

a rotating linear polarizer adapted to output an signal having a power varying with an angle between the polarization state of the linear polarizer and the polarization state of the optical signal including the unpolarized ASE noise outputted from the quarter-wave plate;

a measuring means adapted to a minimum power and a maximum power of the signal outputted from the rotating linear polarizer; and a calculating means adapted to measure a power of the optical signal and a power of the ASE noise included in a bandwidth of an optical signal according to the measured minimum power and maximum power of the signal inputted thereto from the measuring means to obtain the optical signal-to-noise ratio (OSNR).

Preferably, it may be characterized that the measuring means comprises a photodetector adapted to convert the signal inputted thereto from the rotating linear polarizer into an electric signal to output the converted optical signal, and the calculating means comprises a computer or a microprocessor adapted to obtain the optical signal-to-noise ratio (OSNR) according to the electric signal inputted thereto from the measuring means.

BRIEF DESCRIPTION OF THE DRAWINGS

The foregoing and other objects, features and advantages of the present invention will become more apparent from the following detailed description when taken in conjunction with the accompanying drawings in which.

DETAILED DESCRIPTION OF THE PREFERRED EMBODIMENTS

Figure 1:
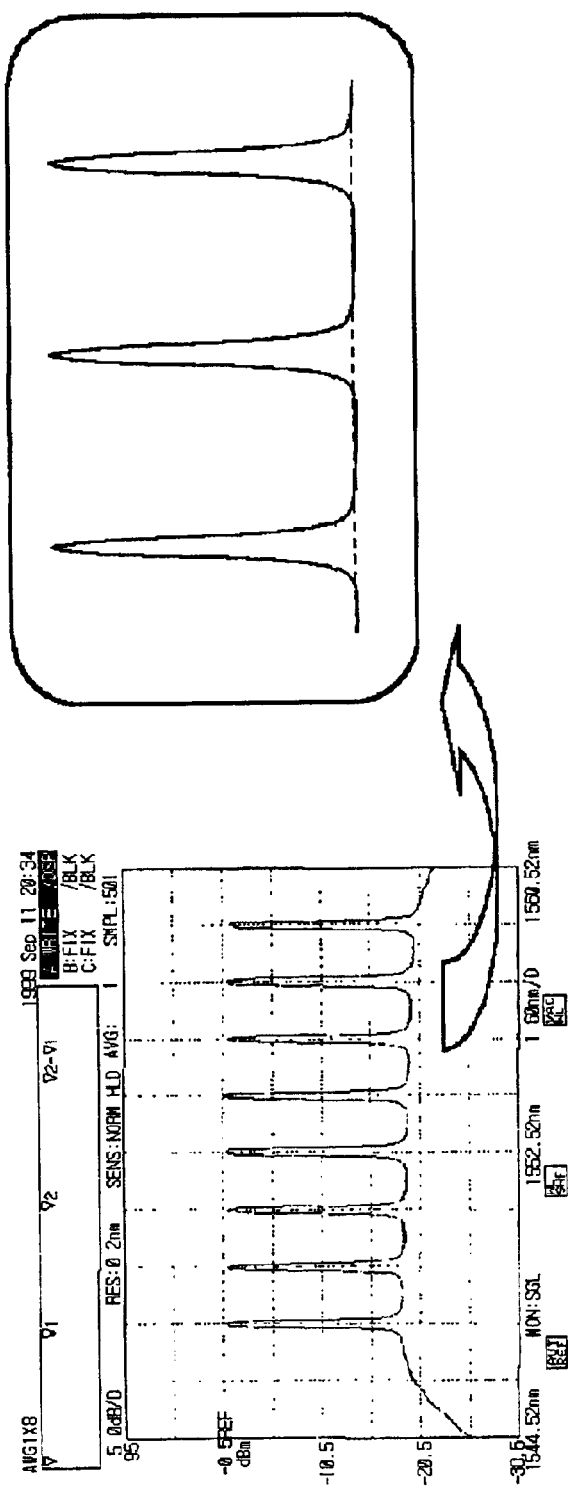
FIG. 1 is a graph illustrating an ASE noise level at a wavelength of an optical signal by a linear interpolation.
Figure 2:
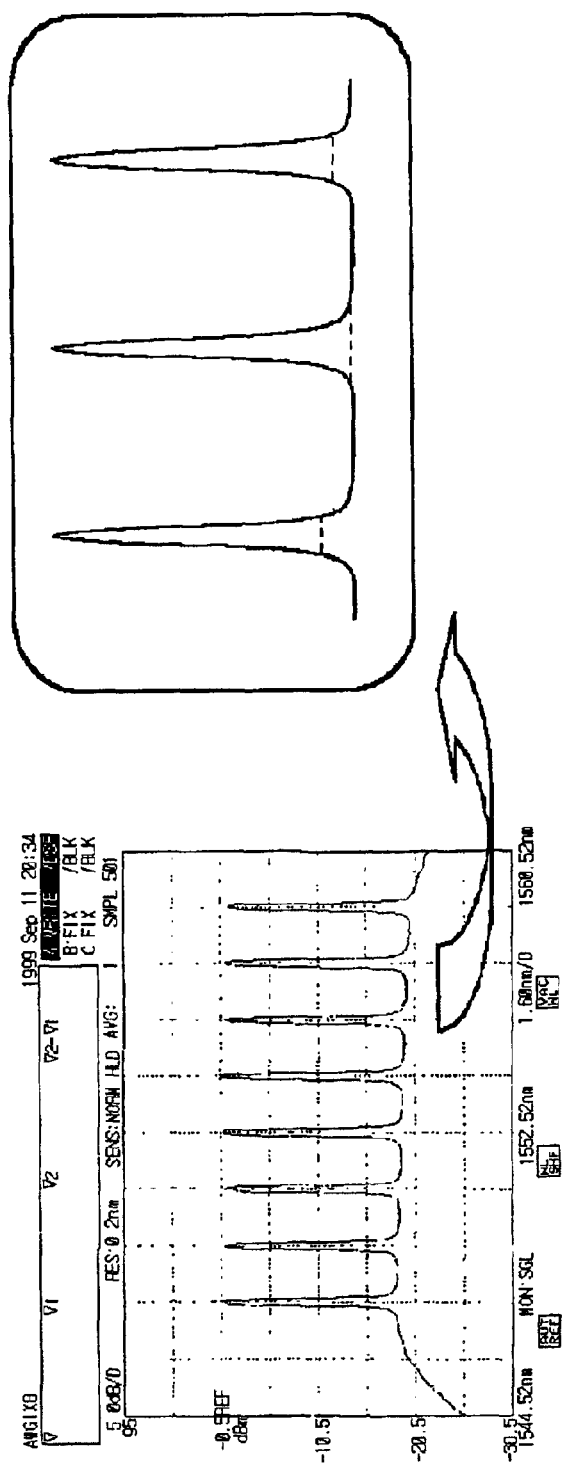
FIG. 2 is a graph illustrating an example of ASE noise levels at wavelengths of respective optical signals passing through different paths and a different number of erbium-doped fiber amplifiers (EDFAs)

Reference will now be made in detail to a method and apparatus for monitoring an optical signal-to-noise ratio (OSNR) using a polarization-nulling method according to the preferred embodiment of the present invention.

Prior to an explanation of the present invention, a quarter-wave plate and a linear polarizer used in the present invention will now be described hereinafter in detail.

An optical signal transmitted in an optical transmission system has a very narrow bandwidth, and is represented by two polarized components forming a right angle to each other. The polarization state of the optical signal is either circular, linear or elliptical according to a difference in the amplitude and the phase of the two polarized components. The polarization state of such an optical signal is changed into other polarization state while being transmitted through an optical fiber.

The quarter-wave plate, which is adapted to increase or decrease a phase difference of two polarized components of an inputted optical signal by a phase difference of 90 degrees. Therefore, a polarization state of an outputted optical signal is determined according to the polarization state of the inputted optical signal. Generally, an arbitrarily polarized optical signal inputted to the quarter-wave plate is polarized linearly more than four times during the 360 degree rotation of the quarter-wave plate, and then the linearly polarized optical signal is outputted. This is disclosed in detail in [Amnon Yariv, "Optical Electronics in Modern Communication", fifth edition, OXFORD, 1996].

When the arbitrarily polarized optical signal is inputted to the linear polarizer, it outputs only a component in the coincident state with the linear polarizer. When a linearly polarized optical signal is inputted to the linear polarizer, if the inputted optical signal is in the coincident state with the linear polarizer, the inputted optical signal is outputted from the linear polarizer as it is. On the contrary, if the inputted optical signal is in the orthogonal state with the linear polarizer, the inputted optical signal is not outputted from the linear polarizer. When a linearly polarized optical signal is inputted to the linear polarizer, a transmission characteristic of the linear polarizer can be written simply by the following [Equation 1].

$$T_{out} = T_{in} \cos^2 \theta \qquad \text{[Equation 1]}$$

Here, $T_{out}$ is a power (watt) of the optical signal outputted from the linear polarizer, $T_{in}$ is a power (watt) of the optical signal inputted thereto, and $\theta$ is an angle (degree) between the polarization state of the optical signal inputted to the linear polarizer and the polarization state of the linear polarizer. If $\theta=0$ degree, the power ($T_{out}$) of the optical signal outputted from the linear polarizer is equal to the power ($T_{in}$) of the optical signal inputted thereto, on the contrary, if $\theta=90$ degrees, the power ($T_{out}$) of the outputted optical signal becomes 0. However, in case of a practical linear polarizer, the power ($T_{out}$) of the optical signal outputted from the linear polarizer when $\theta=90$ degrees is not 0, and but is about $\frac{1}{10000}$ of the power ($T_{out}$) of the optical signal outputted from the linear polarizer when $\theta=0$ degree.

An ASE noise generated by an erbium-doped fiber amplifier (EDFA) has a considerably large bandwidth, and unlike a transmitted optical signal, is unpolarized. Therefore, such an ASE noise passed through the quarter-wave plate remain unpolarized, and a power of the ASE noise is not changed.

When the unpolarized ASE noise is inputted to the linear polarizer, a linearly polarized ASE noise is outputted from the linear polarizer, and a power of the linearly polarized ASE noise outputted from the linear polarizer is a half (½) of the total power of the unpolarized ASE noise inputted thereto.

Therefore, in the case where an arbitrarily polarized optical signal including an unpolarized ASE noise is inputted to a rotating quarter-wave plate which polarizes linearly the inputted optical signal more than four times during the 360 degree rotation of the quarter-wave plate, and then the linearly polarized optical signal including an unpolarized ASE noise is inputted to a rotating linear polarizer, when the polarization state of the optical signal inputted to the rotating linear polarizer is in the coincident with the linear polarizer, the linearly polarized optical signal and the linearly polarized ASE noise included therein are outputted from the linear polarizer. Here, a power of the linearly polarized ASE noise outputted from the linear polarizer is a half (½) of the total power of the unpolarized ASE noise inputted thereto. At this time, a measured power of the signal outputted from the rotating linear polarizer becomes a maximum value. On the contrary, when the polarization state of the inputted optical signal is in the orthogonal state with the linear polarizer, only the linearly polarized ASE noise except the linearly polarized optical signal is outputted from the linear polarizer. Here, a power of the linearly polarized ASE noise outputted from the linear polarizer is also a half (½) of the total power of the unpolarized ASE noise inputted thereto. At this time, a measured power of the signal outputted from the rotating linear polarizer becomes a minimum value. As a result, the power of the optical signal and the total power of the ASE noise included therein can be obtained from the measured maximum power and minimum power of the signal outputted from the rotating linear polarizer, and a power of the ASE noise included in a bandwidth of the optical signal can be obtained from the total power of the ASE noise using the ratio of the bandwidth of the optical signal to a bandwidth of the ASE noise. Accordingly, an optical signal-to-noise ratio can be measured correctly from the power of the optical signal and the power of the ASE noise included in the bandwidth of the optical signal. The present invention employs a rotating quarter-wave plate suitable for a polarization-nulling method which polarizes linearly an arbitrarily polarized optical signal and a rotating linear polarizer for separating the linearly polarized optical signal and the unpolarized ASE noise included therein from each other and measuring an power of each of the optical signal and the ASE noise.

Figure 3:
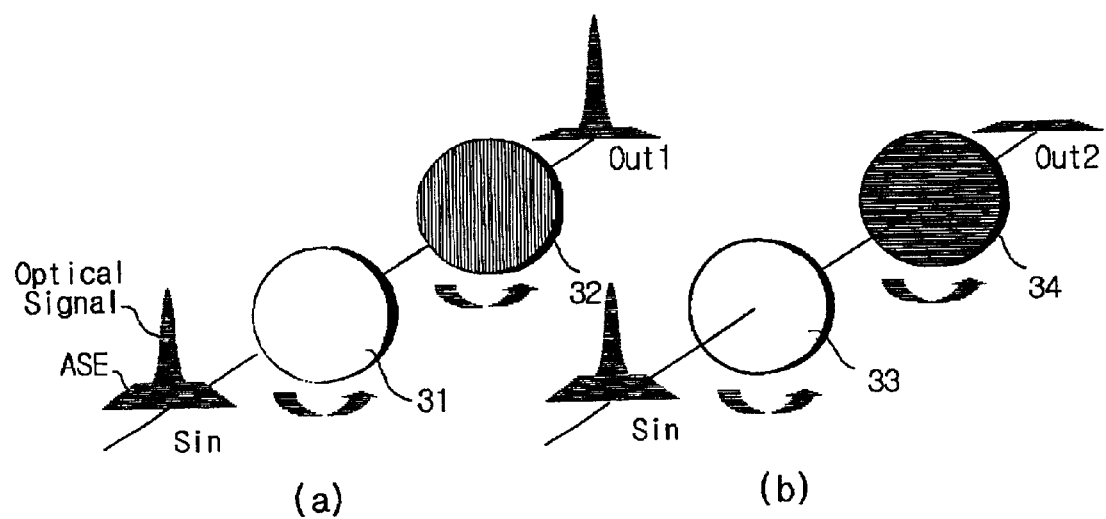
FIG. 3 is a schematic view illustrating a principle of an optical signal-to-noise ratio (OSNR) monitoring method using a polarization-nulling method according to a preferred embodiment of the present invention.

FIG. 3 is a schematic view illustrating a principle of an optical signal-to-noise ratio (OSNR) monitoring method using a polarization-nulling method according to a preferred embodiment of the present invention.

Referring to FIG. 3, an arbitrarily polarized optical signal (Sin) including an unpolarized ASE noise passes through rotating quarter-wave plates 31 and 33, and a rotating linear polarizer 32 and 34.

The arbitrarily polarized optical signal (Sin) including the unpolarized ASE noise is inputted to the rotating quarter-wave plates 31 and 33 which, in turn, linearly polarize the inputted optical signal (Sin) more than four times during the 360 degree rotation of the quarter-wave plate to output the linearly polarized optical signal including the unpolarized ASE noise.

Next, the linearly polarized optical signal including the unpolarized ASE noise outputted from the rotating quarter-wave plates 31 and 33 is inputted to the rotating linear polarizers 32 and 34. At this time, as shown in FIG. 3(a), when the optical signal inputted to the linear polarizer 32 from the quarter-wave plate 31 is in the coincident state with the linear polarizer 32, the linearly polarized optical signal inputted and the linearly polarized ASE noise included therein are outputted from the linear polarizer 32 (Out1).

Here, a power of the outputted signal becomes a maximum power. At this time, a power of the linearly polarized ASE noise outputted from the linear polarizer 32 is a half (½) of the total power of the unpolarized ASE noise inputted thereto.

In the meantime, as shown in FIG. 3(b), when the optical signal inputted to the linear polarizer 34 from the quarter-wave plate 33 is in the orthogonal state with the linear polarizer 34, only the linearly polarized ASE noise except the linearly polarized optical signal is outputted from the linear polarizer 34 (Out2). Here, a power of the outputted signal becomes a minimum power. At this time, a power of the linearly polarized ASE noise outputted from the linear polarizer 34 is also a half (½) of the total power of the unpolarized ASE noise inputted thereto. The maximum power $P_{max}$ and minimum power $P_{min}$ of the outputted signal can be written by the following [Equation 2].

$$P_{max}=P_{signal}+\tfrac{1}{2}P_{ASE} \quad P_{min}=\tfrac{1}{2}P_{ASE} \qquad \text{[Equation 2]}$$

Here, $P_{signal}$ is a power (watt) of the optical signal, and $P_{ASE}$ is a power (watt) of the ASE noise. The power of the inputted optical signal and the power of the ASE noise included therein are $P_{signal}=P_{max}-P_{min}$ and $P_{ASE}=2P_{min}$, respectively. At this time, a power ($P'_{ASE}$) of the ASE noise included in a bandwidth of the optical signal can be obtained by the following [Equation 3].

$$P'_{ASE}=P_{ASE}(BW_{signal}/BW_{ASE}) \qquad \text{[Equation 3]}$$

Here, $BW_{signal}$ is a bandwidth (nanometer) of the optical signal, and $BW_{ASE}$ is a bandwidth (nanometer) of the ASE noise included in the optical signal. In the optical signal-to-noise ratio measurement, the optical signal bandwidth $BW_{signal}$ is assumed generally to be 0.1 nm. A bandwidth of the ASE noise included in a demultiplexed optical signal is determined by a passband of a demultiplexing element. In this experiment, it has been found that a passband of a waveguide grating router (WGR) used for the demultiplexing, i.e., the bandwidth of the ASE noise was 0.862 nm. Like this, the power of the ASE noise included in the bandwidth of the optical signal can be measured. Consequently, an optical signal-to-noise ratio can be obtained by the following [Equation 4].

$$OSNR(dB)=10 \log [P_{signal}/P'_{ASE}] \qquad \text{[Equation 4]}$$

As described above, the optical signal-to-noise ratio (OSNR) monitoring method according to the present invention uses a polarization-nulling phenomenon in which the arbitrarily polarized optical signal including the unpolarized ASE noise is inputted to the rotating quarter-wave plate which, in turn, linearly polarizes the inputted optical signal more than four times during the 360 degree rotation of the quarter-wave plate to output the linearly polarized optical signal.

That is, in the wavelength division multiplexed (WDM) optical transmission system, each demultiplexed optical signal having any polarization state including an unpolarized ASE noise is inputted to the rotating quarter-wave plate, and then to a rotating linear polarizer so that a maximum power and a minimum power of the signal outputted from the rotating linear polarizer are measured to automatically monitor the optical signal-to-noise ratio. Here, the maximum power of the outputted signal is measured when the optical signal inputted to the rotating linear polarizer from the rotating quarter-wave plate is in the coincident state with the linear polarizer, and the minimum power of the outputted signal is measured when the inputted optical signal is in the orthogonal state with the linear polarizer. At this time, when the measured maximum power and minimum power of the signal outputted from the rotating linear polarizer are substituted into [Equation 2] and [Equation 3], respectively, the power of the optical signal and the power of the ASE noise included in the bandwidth of the optical signal can be obtained. Then, when the obtained power of the optical signal and power of the ASE noise included in the bandwidth of the optical signal are substituted into [Equation 4], the optical signal-to-noise ratio (OSNR) can be obtained.

In order to measure the optical signal-to-noise ratio (OSNR) within a range of an error of 0.2 dB using the optical signal-to-noise ratio (OSNR) monitoring method according to the present invention when an actual optical signal-to-noise ratio (OSNR) of an optical signal being inputted is 25 dB, an angle formed between the polarization state of the optical signal (at first, the optical signal is linearly polarized by the rotating quarter-wave plate) inputted to the rotating linear polarizer and the polarization state of the linear polarizer, i.e., θ in [Equation 1] must be within ±1.2 degrees.

Accordingly, in order to measure the optical signal-to-noise ratio (OSNR) within the range of the error of 0.2 dB using the optical signal-to-noise ratio (OSNR) monitoring method according to the present invention when the actual optical signal-to-noise ratio (OSNR) is 25 dB, while the linear polarizer rotates by an angle of 2.4 degrees (±1.2 degrees), the quarter-wave plate must rotate by 360 degrees so that it linearly polarizes an arbitrarily polarized optical signal inputted to the quarter-wave plate to output the linearly polarized optical signal. That is, the rotative speed of the quarter-wave plate must be 150 times as high as that of the linear polarizer. Alternatively, although the rotative speed of the linear polarizer is 150 times as high as that of the quarter-wave plate, the optical signal-to-noise ratio (OSNR) of 25 dB can be measured within the range of the error of 0.2 dB. In this experiment, the rotative speed (15 Hz) of the quarter-wave plate was set to be 150 times as high as that (0.1 Hz) of the linear polarizer.

Figure 4:
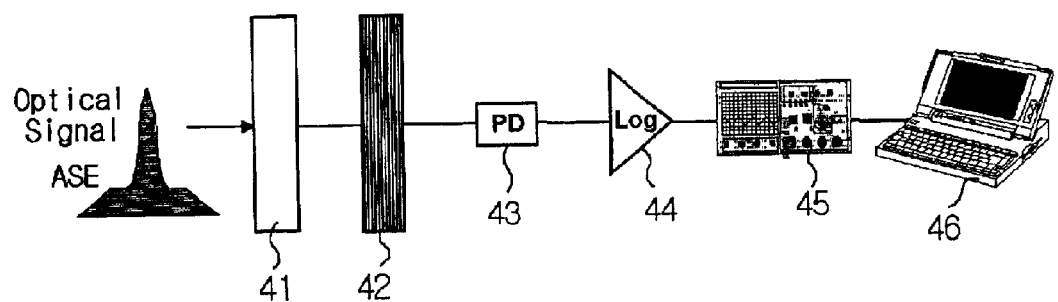
FIG. 4 is a schematic block diagram illustrating the construction of an optical signal-to-noise ratio (OSNR) monitoring apparatus using a polarization-nulling method according to a preferred embodiment of the present invention.

FIG. 4 is a schematic block diagram illustrating the construction of an optical signal-to-noise ratio (OSNR) monitoring apparatus using a polarization-nulling method according to a preferred embodiment of the present invention.

Referring to FIG. 4, the use of normal step motors allows the quarter-wave plate 41 to rotate at a rotative speed of 15 Hz and the linear polarizer 42 to rotate at a rotative speed of 0.1 Hz to monitor the optical signal-to-noise ratio (OSNR). The optical signal passing through the rotating quarter-wave plate 41 and the rotating linear polarizer 42 in order is applied to a photodetector (PD) 43 which converts the signal outputted from the rotating linear polarizer 42 into a voltage to apply the converted voltage to a logarithmic amplifier 44. Then, the logarithmic amplifier 44 amplifies the converted voltage for application to an oscilloscope 45 which displays the amplified voltage on a screen thereof. At this time, among the voltages displayed on the screen of the oscilloscope 45 a maximum voltage and a minimum voltage are inputted to a computer 46 which measures the optical signal-to-noise ratio from the maximum voltage and minimum voltage. Since there exists a linear relationship between the voltage converted by the photodetector 43 and a power of the optical signal, a maximum power of the optical signal is converted into the maximum voltage, and a minimum thereof is converted into the minimum voltage. Accordingly, the computer 46 substitutes the maximum power and minimum power obtained from the maximum voltage and minimum voltage inputted thereto into [Equation 2], [Equation 3] and [Equation 4] to measure the optical signal-to-noise ratio.

Figure 5:
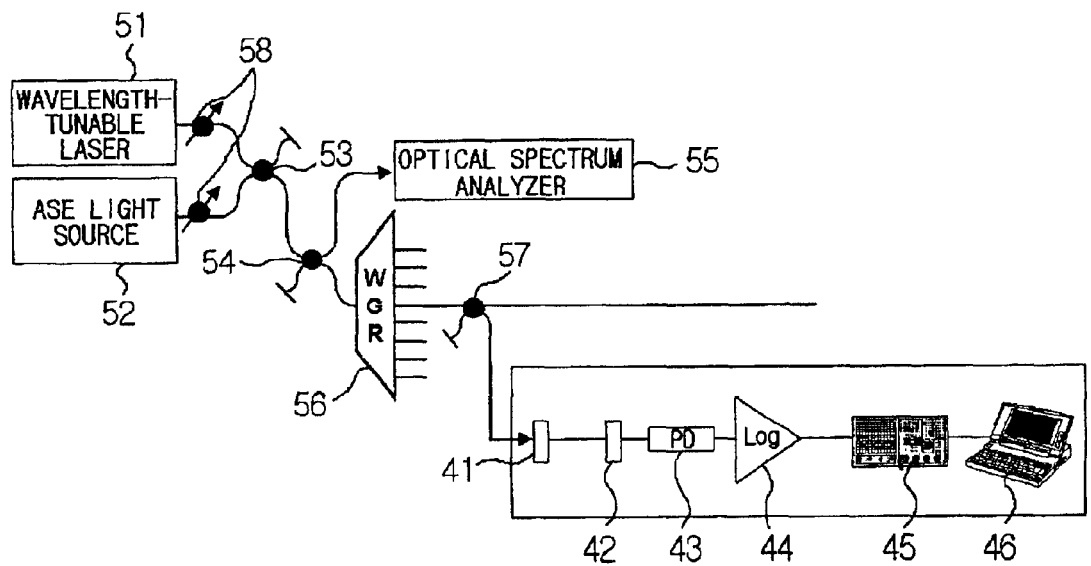
FIG. 5 is a schematic block diagram illustrating the construction of an experimental device for verifying validity of an optical signal-to-noise ratio (OSNR) monitoring method according to a preferred embodiment of the present invention.

FIG. 5 is a schematic block diagram illustrating the construction of an experimental device for verifying validity of an optical signal-to-noise ratio (OSNR) monitoring method according to a preferred embodiment of the present invention.

Referring to FIG. 5, an arbitrarily polarized optical signal is supplied by a wavelength-tunable laser 51, and an erbium-doped fiber amplifier (EDFA) is used as an unpolarized ASE light source 52 to supply an ASE noise. The optical signal and the ASE noise combined by a 3-dB coupler 53 are divided into two parts by a 3-dB coupler 54. One part of the two parts is inputted to an optical spectrum analyzer (OSA) 55 which measures the optical signal-to-noise ratio (OSNR) using a linear interpolation method. At this time, a bandwidth of the optical signal is very narrow, and that of the ASE noise is considerably large and the ASE noise level in the bandwidth is flat, the optical signal-to-noise ratio (OSNR) measured by the linear interpolation method can be considered to be correct.

On the contrary, after the other part has passed through a waveguide grating router (WGR) 56 used for a demultiplexing, it is inputted to a 3-dB coupler 57 which divides the other part into two parts. One part of the two parts divided by the 3-dB coupler 57 is inputted to the optical signal-to-noise ratio (OSNR) monitoring apparatus which measures the optical signal-to-noise ratio (OSNR). A channel spacing and a passband of the waveguide grating router (WGR) 56 used as a demultiplexer are 1.6 nm and 0.862 nm, respectively. The use of optical variable attenuators 58 disposed in the rear of the wavelength-tunable laser 51 and the ASE light source 52 allows an increase or decrease of the power of the optical signal and the power of the ASE noise to vary the optical signal-to-noise ratio (OSNR).

Figure 6:
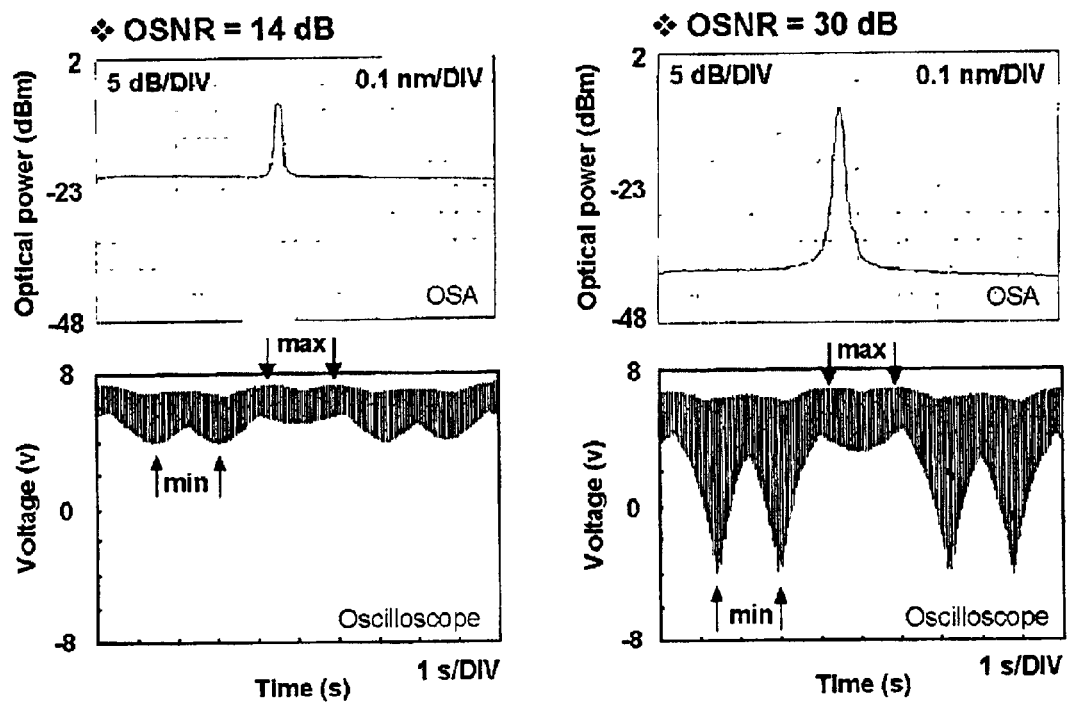
FIG. 6 is a graph illustrating optical spectrums measured by an optical spectrum analyzer and voltage waveforms measured by an optical signal-to-noise ratio (OSNR) monitoring apparatus according to a preferred embodiment of the present invention when the optical signal-to-noise ratio (OSNR) is 14 dB and 30 dB, respectively.

FIG. 6 is a graph illustrating optical spectrums measured by an optical spectrum analyzer and voltage waveforms displayed by the oscilloscope of an optical signal-to-noise ratio (OSNR) monitoring apparatus according to a preferred embodiment of the present invention when the optical signal-to-noise ratio (OSNR) of the optical signal being inputted is 14 dB and 30 dB, respectively.

Referring to FIG. 6, in the optical signal-to-noise ratio (OSNR) monitoring method according to the present invention, since the maximum power and the minimum power of the signal are outputted more than four times from the rotating linear polarizer during the 360 degree rotation of the linear polarizer, in this experiment, the maximum voltage (max) and the minimum voltage (min) appear more than four times on the screen of the oscilloscope for 10 seconds. Accordingly, the optical signal-to-noise ratio (OSNR) can be measured more than four times for 10 seconds.

Figure 7:
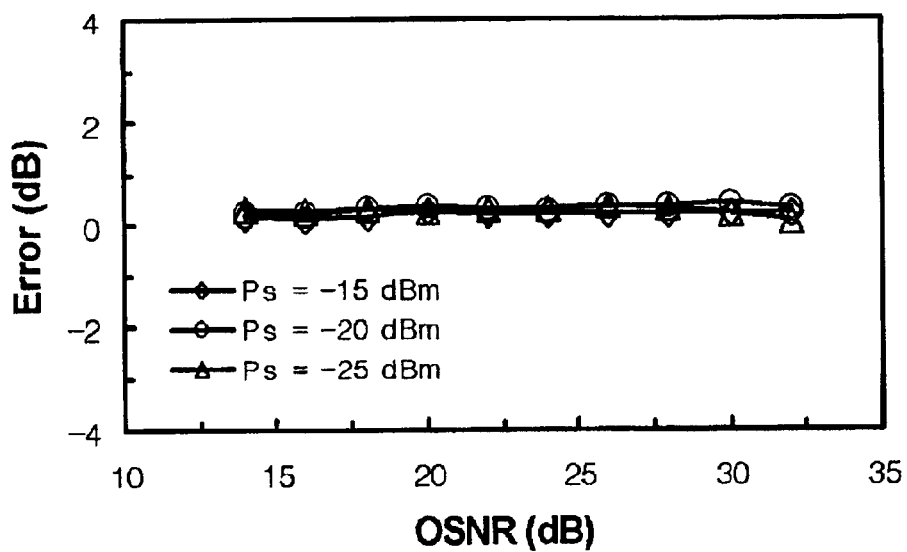
FIG. 7 is a graph illustrating an error between an optical signal-to-noise ratio (OSNR) measured by an optical spectrum analyzer and an optical signal-to-noise ratio (OSNR) measured by an optical signal-to-noise ratio (OSNR) monitoring apparatus according to a preferred embodiment of the present invention while a power of an optical signal changes from −15 dBm to −25 dBm.

FIG. 7 is a graph illustrating an error between an optical signal-to-noise ratio (OSNR) measured by an optical spectrum analyzer and an optical signal-to-noise ratio (OSNR) measured by an optical signal-to-noise ratio (OSNR) monitoring apparatus according to a preferred embodiment of the present invention.

In FIG. 7, Ps is a power of the optical signal inputted to the optical signal-to-noise ratio (OSNR) monitoring apparatus according to the present invention. As can be seen from the results, the two measured optical signal-to-noise ratios (OSNRs) are coincident with each other, and a maximum error between the two measured optical signal-to-noise ratios (OSNRs) is no more than 0.4 dB.

As can be seen from the foregoing, according to the optical signal-to-noise ratio (OSNR) monitoring method of the present invention, an optical signal and an ASE noise included therein are separated from each other, and an power of each of the optical signal and the ASE noise is measured by using a rotating quarter-wave plate and rotating linear polarizer so that the optical signal-to-noise ratio (OSNR) can be monitored correctly. Further, the optical signal-to-noise ratio (OSNR) monitoring apparatus of the present invention has an advantage in that since its structure is simple, it can be implemented economically and more easily.

While this invention has been described in connection with what is presently considered to be the most practical and preferred embodiment, it is to be understood by those skilled in the art that the invention is not limited to the disclosed embodiment, but, on the contrary, it is intended to cover various modifications within the spirit and scope of the appended claims.

What is claimed is:

1. A method for monitoring an optical signal-to-noise ratio (OSNR) using a polarization-nulling method, comprising the steps of:

(a) linearly polarizing an arbitrarily polarized optical signal including an unpolarized ASE noise;

(b) separating the optical signal and the ASE noise from the linearly polarized optical signal including the unpolarized ASE noise to measure a power of the optical signal and a power of the ASE noise included in a bandwidth of an optical signal; and (c) obtaining the optical signal-to-noise ratio (OSNR) using the measured optical signal power and ASE noise power, wherein the step (a) comprises the step of:

(a1) allowing the polarization of the linearly polarized optical signal including the unpolarized ASE noise to be continuously changed; and wherein the step (b) comprises the steps of:

(a2) measuring a minimum power and a maximum power of the signal outputted from a linear polarizer; and (a3) measuring the power of the optical signal and the power of the ASE noise included in the bandwidth of the optical signal from the measured minimum power and maximum power of the signal outputted from the linear polarizer.

2. The method according to claim 1, wherein the step (a) is performed by allowing the arbitrarily polarized optical signal including the unpolarized ASE noise to pass through a rotating quarter-wave plate.

3. The method according to claim 1 or 2, wherein the step (b) further comprises the step of:

separating the optical signal and the ASE noise from the linearly polarized optical signal by allowing the linearly polarized optical signal including the unpolarized ASE noise to pass through a rotating linear polarizer.

4. An apparatus for monitoring an optical signal-to-noise ratio (OSNR) using a polarization-nulling method, comprising:

a rotating quarter-wave plate means for causing 360 degree rotation of a quarter-wave plate and linearly polarizing an arbitrarily polarized optical signal including an unpolarized ASE noise more than four times during the 360 degree rotation of the quarter wave plate to output the linearly polarized optical signal;

a rotating linear polarizer means for causing rotation of a linear polarizer and outputting a signal having a power varying with an angle between the polarization state of the inputted optical signal including the unpolarized ASE noise from the quarter-wave plate means and the polarization state of the linear polarizer means;

a measuring means for measuring a minimum power and a maximum power of the signal outputted from the rotating linear polarizer means; and a calculating means for measuring a power of the optical signal and power of the ASE noise included in a bandwidth of an optical signal according to the measured minimum power and maximum power of the signal inputted thereto from the measuring means to obtain the optical signal-to-noise ratio (OSNR).

5. An apparatus according to claim 4, wherein the measuring means comprises a photodetector means for converting the signal inputted thereto from the rotating linear polarizer means into an electric signal to output the converted optical signal, and the calculating means comprises a computer or a microprocessor means for obtaining the optical signal-to-noise ratio (OSNR) according to the electric signal inputted thereto from the measuring means.

* * * * *